United States Patent
Mott et al.

(10) Patent No.: US 7,235,205 B2
(45) Date of Patent: Jun. 26, 2007

(54) INTEGRATED FLANGE SEAL ELECTRICAL CONNECTION

(75) Inventors: Allen Mott, Westland, MI (US); Louis Carrer, Rockwood, MI (US); John Jordan, Westland, MI (US)

(73) Assignee: FCI Americas Technology, Inc., Reno, NV (US)

( * ) Notice: Subject to any disclaimer, the term of this patent is extended or adjusted under 35 U.S.C. 154(b) by 140 days.

(21) Appl. No.: 10/820,259

(22) Filed: Apr. 7, 2004

(65) Prior Publication Data

US 2004/0192117 A1 Sep. 30, 2004

Related U.S. Application Data

(62) Division of application No. 10/206,584, filed on Jul. 26, 2002, now Pat. No. 6,821,162.

(51) Int. Cl.
*B29C 45/14* (2006.01)
(52) U.S. Cl. ............ 264/255; 264/250; 264/259; 264/274
(58) Field of Classification Search ........ 264/250, 264/255, 259, 274; 439/736, 722
See application file for complete search history.

(56) References Cited

U.S. PATENT DOCUMENTS

| | | | | |
|---|---|---|---|---|
| 2,583,026 A * | 1/1952 | Swift | ............... | 174/117 R |
| 4,198,465 A | 4/1980 | Moore et al. | ............... | 264/1.1 |
| 4,398,785 A | 8/1983 | Hedrick | ............... | 439/736 |
| 4,822,434 A * | 4/1989 | Sawaki et al. | ............... | 156/48 |
| 5,527,502 A * | 6/1996 | Kiuchi et al. | ............... | 264/250 |
| 5,567,375 A | 10/1996 | Filion et al. | ............... | 264/266 |
| 5,855,834 A * | 1/1999 | Ysbrand | ............... | 264/277 |
| 6,187,242 B1 * | 2/2001 | Onoda | ............... | 264/255 |
| 6,254,820 B1 | 7/2001 | Cornell | ............... | 264/274 |
| 6,257,920 B1 * | 7/2001 | Finona et al. | ............... | 439/455 |
| 6,287,502 B1 * | 9/2001 | Onoda | ............... | 264/263 |
| 6,365,085 B2 * | 4/2002 | Takahashi | ............... | 264/261 |
| 6,503,436 B1 * | 1/2003 | Koguchi et al. | ............... | 264/277 |
| 6,506,083 B1 | 1/2003 | Bickford et al. | ............... | 439/36 |
| 6,780,067 B1 * | 8/2004 | Kono et al. | ............... | 439/736 |

* cited by examiner

*Primary Examiner*—Angela Ortiz
(74) *Attorney, Agent, or Firm*—Harrington & Smith, PC

(57) ABSTRACT

Disclosed herein are a method and an apparatus for providing a high efficiency seal in an electrical connector. The seal provides an impediment to the passage of fluid at one end of the electrical connector to the environment at the other end of the electrical connector. The electrical connector may be incorporated into an over-mold that contains other components. The electrical connector achieves the highly efficient seal through a combination of a dual torturous path design, incorporation of melt ribs, and may further involve the technique of impregnation.

18 Claims, 8 Drawing Sheets

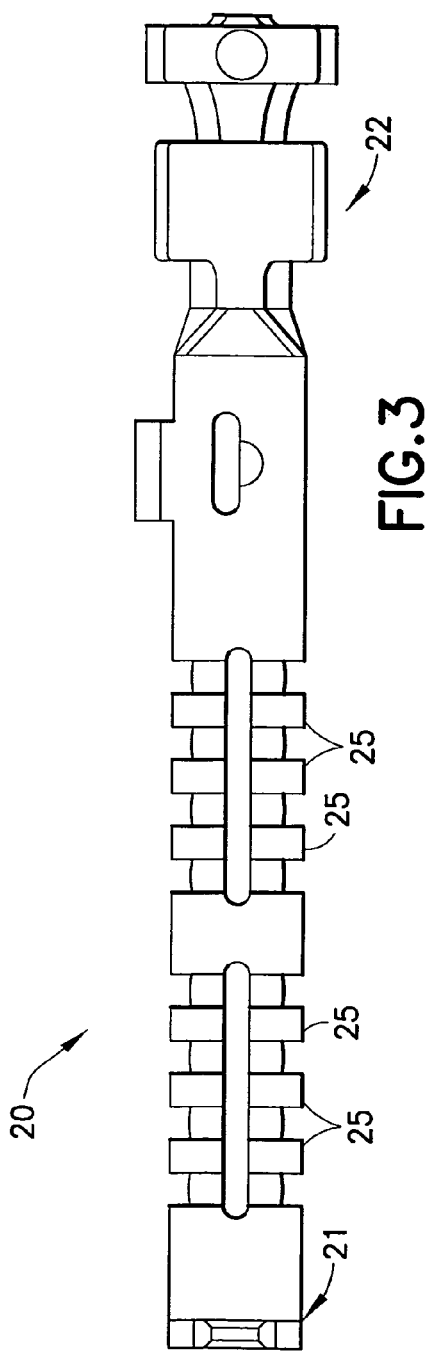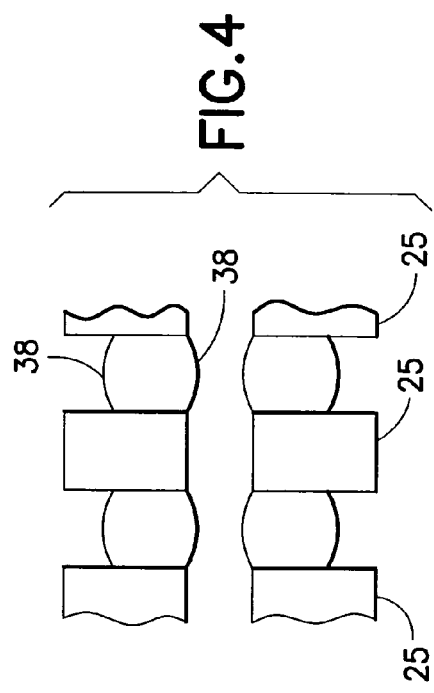

INTEGRATED FLANGE SEAL ELECTRICAL CONNECTION

CROSS REFERENCE TO RELATED APPLICATION

This is a divisional patent application of U.S. patent application Ser. No. 10/206,584 filed Jul. 26, 2002, now U.S. Pat. No. 6,821,162.

BACKGROUND OF THE INVENTION

1. Field of the Invention

The invention relates to a connector for interconnection of electrical devices, where the connector provides an impediment to the passage of foreign material.

2. Brief Description of Prior Developments

Various methods have been used to seal electrical connectors installed in penetrations to liquid fuel tanks. Known techniques include use of washers, o-rings, and other similar structures. One other technique uses a "torturous path" incorporated into a plastic connector.

The torturous path technique relies upon a series of ribs, or similar features to limit the migration of a fluid or gaseous component from one end of the sealed electrical connector to the other. This technique makes use of a path filled with twists and turns that restrict the flow. An example of a component using the torturous path technique is a 2×2 Fuel Header available from the assignee of this patent application, which provides for a torturous path between the electrical conductor pin and the material forming the connector body. While this technique is adequate for many applications, it may be desirable to provide an electrical connector having greater resistance to fluid or vapor passage.

What is needed is a highly effective technique for sealing electrical connectors.

SUMMARY OF THE INVENTION

The foregoing and other problems are overcome by methods and apparatus in accordance with embodiments of this invention.

Disclosed herein in terms of the preferred embodiment is a technique for providing an electrical connection device characterized by a highly effective seal against the migration of foreign matter including, but not limited to fluids such as liquid, gaseous, or vapor form materials, or components thereof. For convenience, aspects of the invention are herein referred to as a "flange electrical connection" or FEC. The FEC may be integrated into a flange seal that contains other devices, such as fuel lines. A flange seal that contains a FEC in combination with other devices is referred to herein as an "Integrated Flange Seal," or IFS. Although the FEC may ultimately be an element of an IFS, the disclosure herein focuses upon the FEC, and aspects of the FEC.

In the disclosure provided herein, the FEC is discussed in terms of an electrical connection to a fuel tank, where the tank contains a hydrocarbon based fuel. Those skilled in the art will recognize that the invention disclosed herein may be used in other embodiments to protect against the transmission of matter foreign through the electrical connector, including fluids such as liquids, vapors or gases, without deviating from the teachings disclosed herein.

In accordance with an aspect of this invention, the FEC incorporates a dual torturous path design. As used herein, the "torturous path" design involves a series of twists and turns, or other similar features in certain elements of the FEC. Once assembled, the twists and turns serve to create a torturous path between the body of the electrical connector and the internal electrical conductors, and the body of the electrical connector and the external structure (i.e. overmold), thereby effectively limiting the passage of foreign matter through and around the connector body.

In accordance with another aspect of this invention, the FEC further incorporates melt ribs. As used herein, "melt ribs" include any plastic molding technique where added plastic features are used to create a seal upon the application of a sufficient amount of thermal energy to the FEC materials.

In accordance with another aspect of this invention, the FEC further makes use of the manufacturing technique known as impregnation. As used herein, "impregnation" refers to any technique involving a decompression cycle intended to eliminate gas (air) bubbles or other imperfections in sealing materials.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 is a side view of the electrical conductor used within the FEC.

FIG. 4 is an exploded view of a portion of the electrical conductor used within the FEC.

FIG. 9-1 and FIG. 9-2, collectively referred to as FIG. 9, illustrates a magnified portion of the electrical connector of FIG. 6, where melt ribs are incorporated into the electrical connector.

The drawings provided herein are considered only to be exemplary and illustrative of embodiments of the FEC, and are not to be considered limiting of the FEC.

DETAILED DESCRIPTION OF THE EMBODIMENTS

Figure 1:
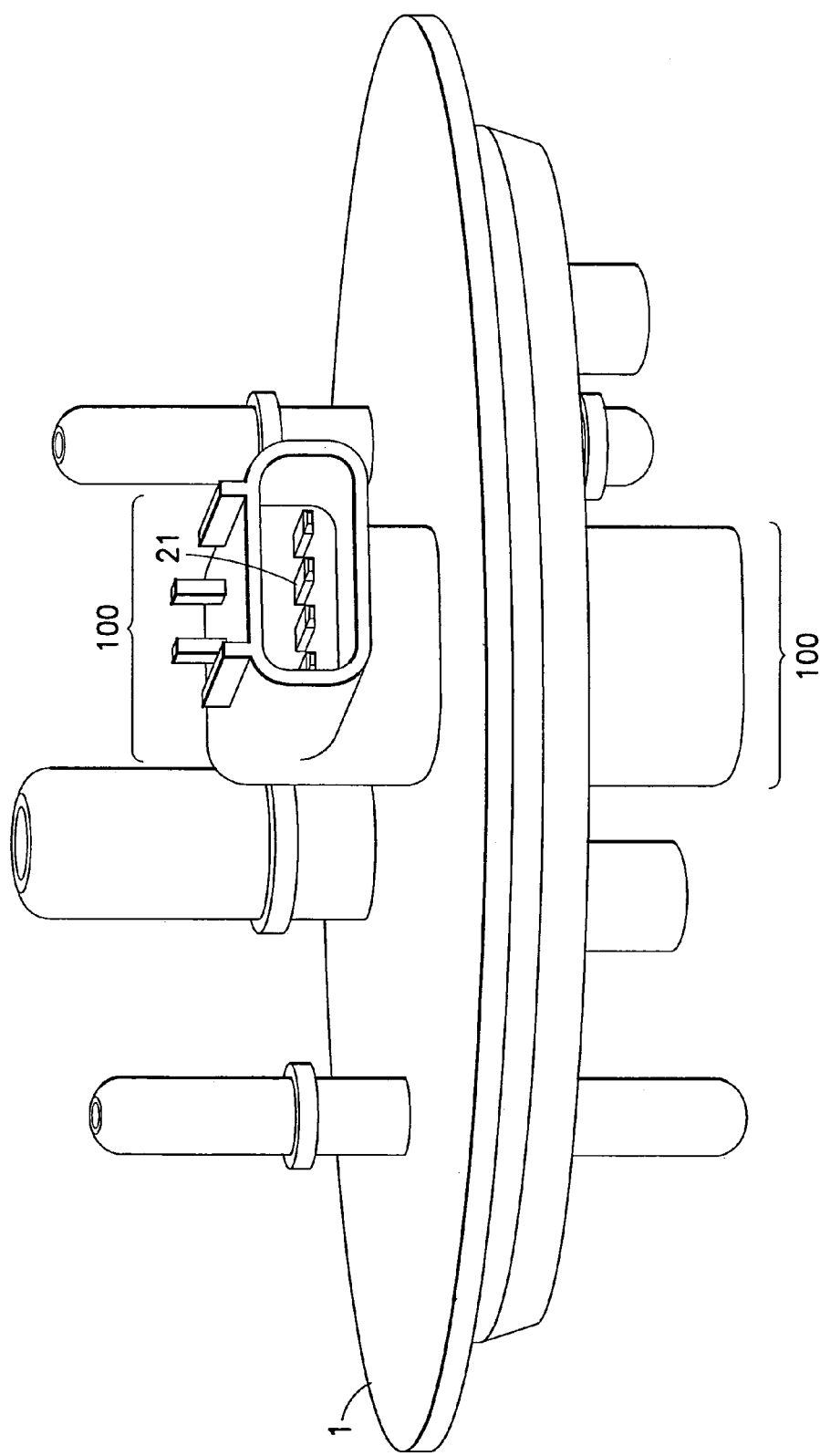
FIG. 1 is a perspective view of one embodiment of the FEC incorporated into a penetration seal cover, which supports other devices including a fuel line.

FIG. 1 shows a perspective view of a flange electrical connector 100, also referred to herein as a FEC 100, incorporating features of the present invention. In the preferred embodiment described herein, the FEC 100 is incorporated into an Integrated Flange Seal 1, or IFS 1, intended for use in an automobile. In alternate embodiments, the FEC 100 provides a barrier to other foreign matter, which may include fluids such as liquid, gaseous or vapor form material. Although the present invention will be described with reference to the exemplary embodiment shown in the drawings, it should be understood that the present invention can be embodied in many alternate embodiments. For example, any suitable size, shape, or type of elements or materials could be used.

The FEC 100, in this embodiment, is used for providing electrical connection with conventional devices located within a fuel tank (not shown), such as a fuel level sensor or an electrically driven fuel pump. The fuel tank devices are not shown, or described herein. It should be understood that the FEC 100 may be designed and constructed so as to provide for a variety of electrical connections as needed. For example, the FEC 100 may contain single or multiple electrical conductors, and the electrical conductors may further have distinctly different electrical properties. The actual configuration of the FEC 100 is dependent upon many factors, including by not limited to, the needs of the user.

In the preferred embodiment, the FEC 100 is capable of achieving very low transmission levels of hydrocarbons. The term "very low" means that the FEC 100 is capable of impeding the passage of hydrocarbon fuel, and the fuel components, to a level that is either a fraction of the quantity achieved by conventional connectors, or alternatively, "very low" means the FEC 100 is capable of reliably meeting specifications imposed by applicable regulation for the limitation of passage of hydrocarbons (or other fuel components). Expressed another way, the FEC 100 provides a "highly effective" seal impeding the passage of hydrocarbon fuel, and hydrocarbon based fuel components.

In one embodiment of the FEC 100 as disclosed herein, where the FEC 100 includes only the dual torturous path, the helium leak rate through the FEC was about $10^{-4}$ cc/min. In another embodiment, where melt ribs also were used in the FEC 100, the helium leak rate ranged from about $10^{-5}$ cc/min to about $10^{-7}$ cc/min. In the embodiment using impregnation, the helium leak rate was about $10^{-8}$ cc/min.

This disclosure includes teachings related to: aspects of electrical conductors assembled and incorporated into a pre-mold electrical connector FEC 100; aspects of the pre-mold electrical connector FEC 100; and aspects of the post-mold IFS 1.

The Electrical Conductor

Figure 2:
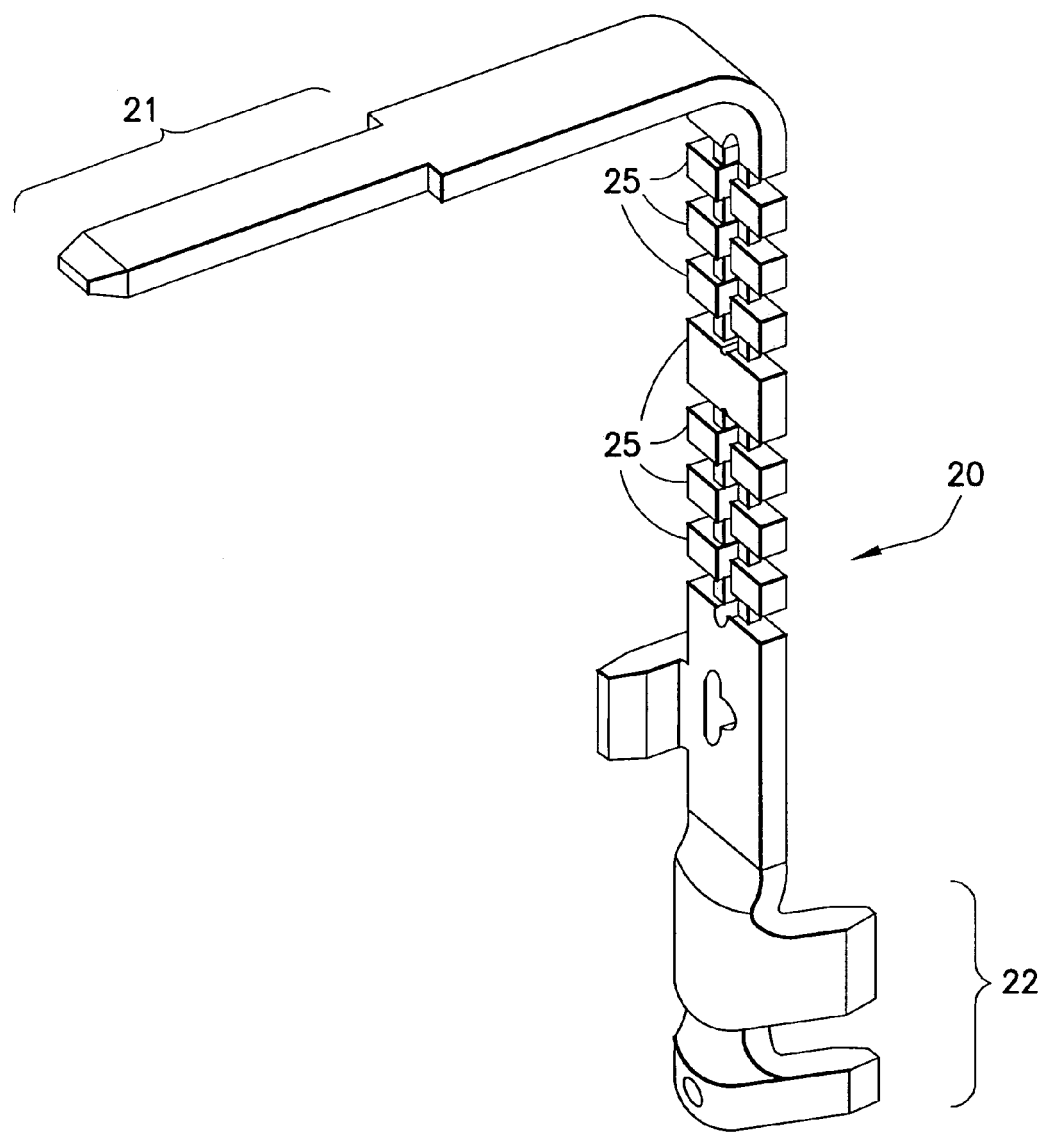
FIG. 2 is a perspective view of an electrical conductor used within the FEC.

FIG. 2 shows an electrical conductor 20 used in the FEC 100. The electrical conductor 20 is characterized by a series of ribs 25. The ribs 25 are incorporated to provide a "torturous path" for fluids when the pre-molded connector body is molded over the electrical conductor 20. For purposes of this invention, a fluid (fluids) may be a liquid, gas or vapor, or a combination-thereof. The fluid that is sealed against may be considered undesirable foreign material.

The torturous path technique relies upon a series of ribs 25, or similar features, to provide a series of twists and turns that effectively restrict flow of fluid between the electrical conductor 20 and the material in the body of the electrical connector. The appearance and character of the series of ribs 25 is dependent upon a variety of factors, including but not limited to, temperature, pressure, and viscosity of the fluid. In this embodiment, the electrical conductor 20 is coined from a copper alloy and is further dipped in hot tin. The electrical conductor 20 in this non-limiting embodiment has about 80% electrical conductivity, or greater.

The electrical conductor 20 has electrical contacts at each end. At the top end, the electrical conductor 20 has an electrical contact that is referred to herein as a male contact 21. At the bottom end of the electrical conductor 20, an electrical contact is included that is referred to herein as a flap style contact 22. The flap style contact 22 is set in a V shape, where the flaps make reliable electrical contact when subsequently wrapped or crimped over a wire or other suitable electrical device.

FIG. 3 shows the electrical conductor 20 from a frontal view. The topmost portion of the electrical conductor 20 includes the male contact 21. FIG. 3 provides a more detailed view of the electrical conductor 20. In this embodiment, the electrical conductor 20 includes at least six ribs 25 included to provide a torturous path for protection against the migration of fluids from one end to the other end of the electrical conductor 20. In other embodiments, the series of ribs 25 may be limited to at least one rib. The characteristics chosen for the series of ribs 25 depends upon a variety of factors, including but not limited to, temperature, pressure and viscosity of the fluid.

FIG. 4 provides an exploded view of a portion of the electrical conductor 20. The view in FIG. 4 shows permissible distortion 38 in the rib 25 components of the electrical conductor 20. These appear as convex and concave distortions 38 in the surface of the electrical conductor 20. These distortions 38 serve to further improve the effect of the torturous path technique. In other embodiments, features, such as but not limited to, convex or concave distortions 38, appear and are used to enhance the features included for provision of a torturous path.

Figure 5:
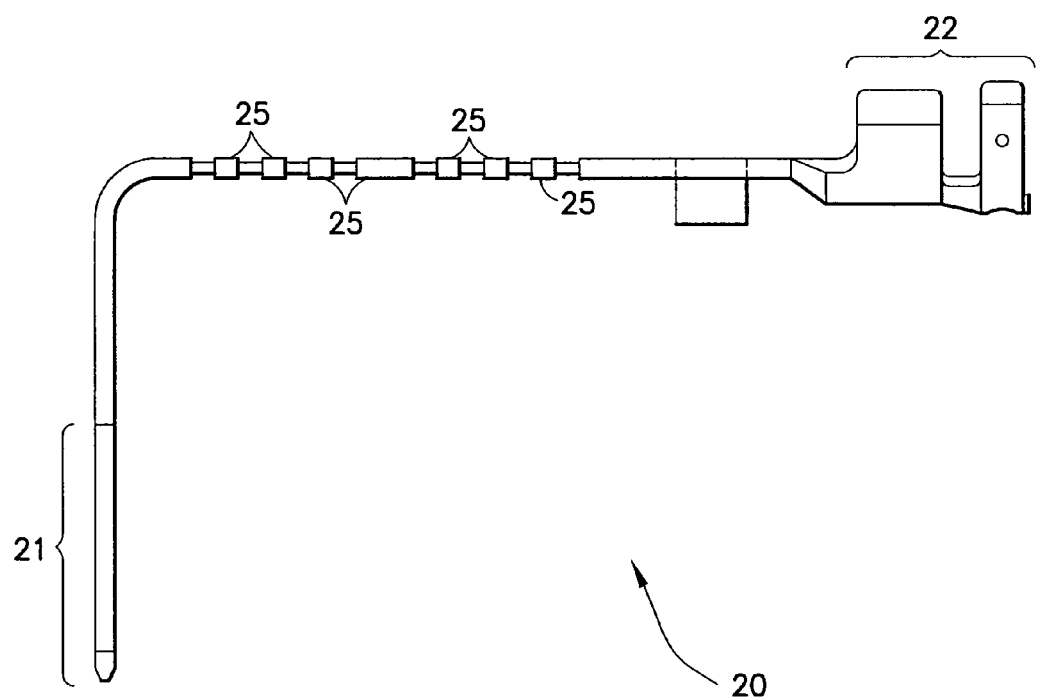
FIG. 5 is a diagram of the electrical conductor used within the FEC of FIG. 1, rotated 90° from the view shown in FIG. 3.

FIG. 5 provides a side view of the electrical conductor 20. The male contact 21 is shown pointed downward, as the electrical conductor 20 is shown in a horizontal position. A 90° bend is shown, the bend included for directing the electrical conductor 20 downward when the electrical conductor 20 is incorporated into the FEC 100. FIG. 5 shows that the ribs 25 are visible from the side. When taken in combination with the perspective provided in FIG. 3, it can be seen that the ribs 25 are pronounced around the exterior surface of the electrical conductor 20. Once assembled as a FEC 100, the incorporation of ribs 25 that circumscribe the electrical conductor 20 provides a torturous path for fluid migrating along the electrical conductor 20, regardless of the path taken.

FIG. 5 also shows the electrical contacts at the bottom of the electrical conductor 20 that are referred to as the flap style contact 22. In this embodiment, the flap style contact 22 is used to provide a permanent type of connection, where installation involves bending or crimping of the flap style contact 22 over an electrical conductor. In this embodiment, breaking the electrical connection is most conveniently achieved by unclipping and/or slipping off a female contact that mates with the male contact 21. In other embodiments, other styles of electrical connectors are incorporated into the electrical conductor 20, in place of or in addition to the male contact 21 and/or the flap style contact 22. For example, a female connection is incorporated in place of the flap style contact 22.

The electrical conductors 20 can be assembled into an array (not shown) for incorporation into a molded connector. The array is assembled using known techniques. Forming of the electrical connector then takes place using known molding techniques with a suitable insulating material, or combination of materials. Although the electrical connector is actually formed from molded plastic, the electrical connector is referred to as the "pre-mold." This reference is made for convenience, as the pre-mold connector is later incorporated into a second molding. The second molding produces the FEC 100, which is an integrated component of the IFS 1. The second molding is produced using "over-mold" material, in an "over-molding" process.

The Pre-Mold Electrical Connector

Forming the electrical connector involves molding a body around the array, where the array is jacketed with a suitably chemically and electrically resistive plastic material. In one embodiment, polyoxymethylene (POM) is used to finish the array into a pre-mold electrical connector 40, as shown in FIG. 6.

Figure 6:
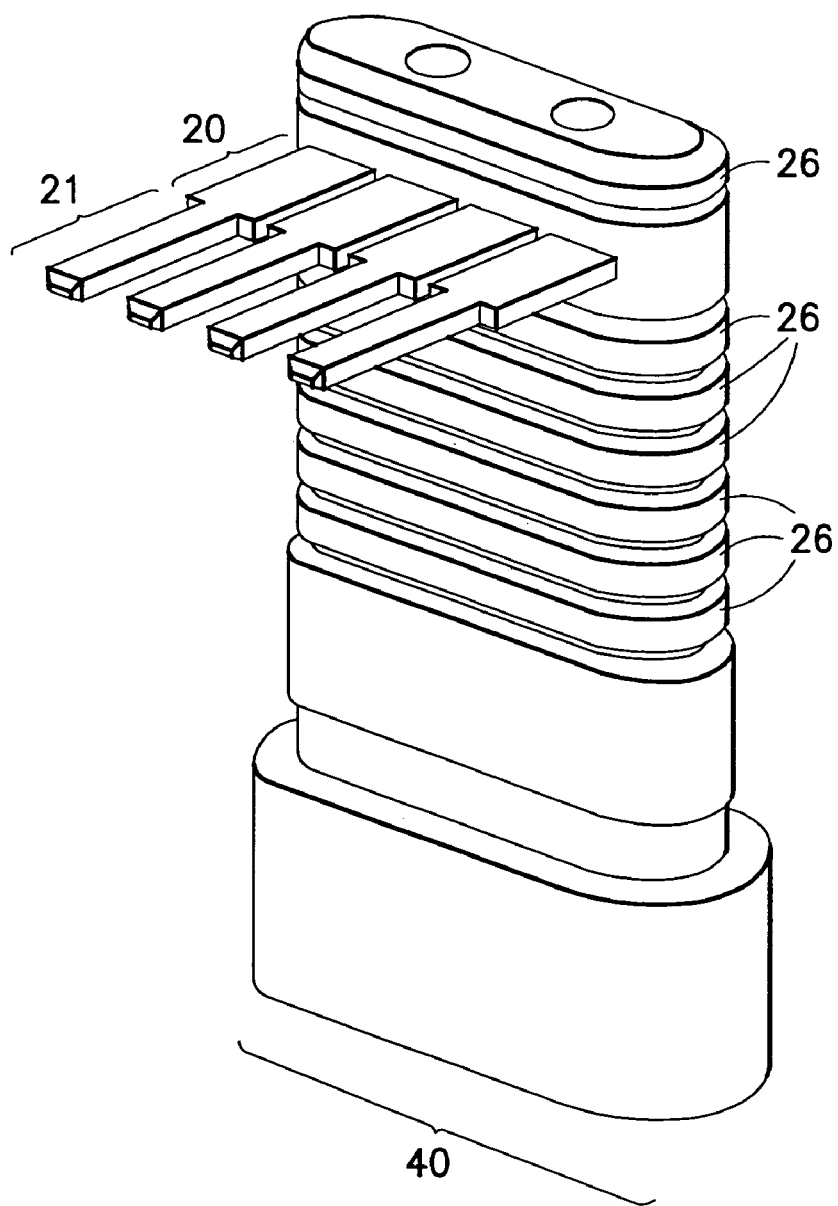
FIG. 6 is a perspective view of a pre-mold electrical connector prior to final molding.

The pre-mold electrical connector 40 is shown in FIG. 6. The electrical connector 40 shown in FIG. 6 shows the top portion of the array of electrical conductors 20. In FIG. 6, the male contact 21 is shown protruding from the electrical connector 40 with the top most portion of each electrical conductor 20. Once assembled, the electrical connector 40 also makes use of the torturous path technique for impeding the passage of a fluid through the space between the electrical connector 40 and the FCS 1. That is, a second series of ribs 26 is incorporated into the trunk of the electrical connector 40 and form a second torturous path, when considered with the first torturous path provided between the conductor 20 and the body of the electrical connector 40. The second series of ribs 26 in the electrical connector 40 are also shown in FIGS. 7-8.

Figure 7:
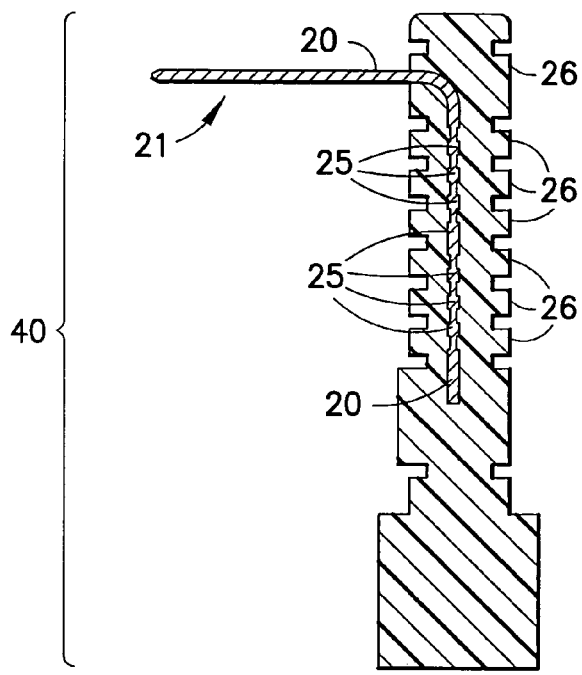
FIG. 7 is a side cross-sectional view of the pre-mold connector.
Figure 8:
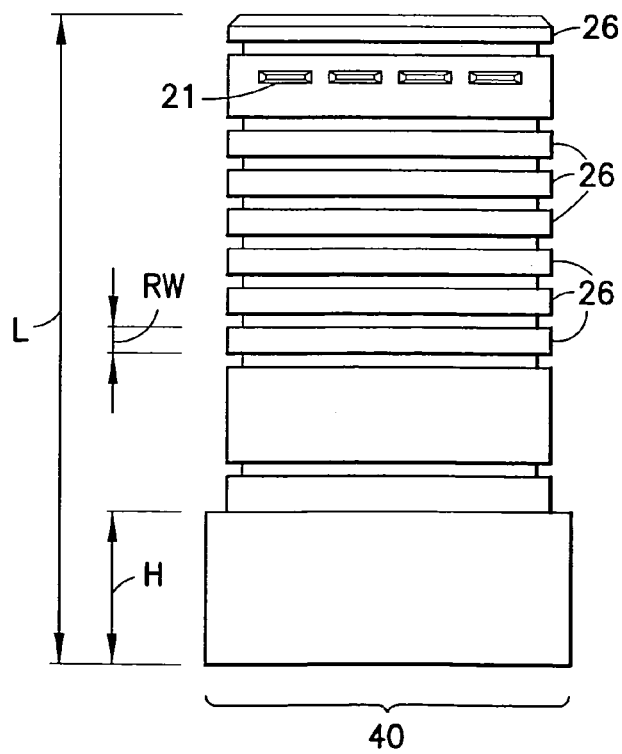
FIG. 8 is a front view of the pre-mold connector.

FIG. 7 is a side cross-sectional view of the pre-mold or electrical connector 40. This view shows an electrical conductor 20, and shows both the first series of ribs 25, and the second series of ribs 26. When taken in combination with FIG. 7, FIG. 8 shows that the second series of ribs 26 circumscribe the electrical connector 40.

In the preferred embodiment, the electrical connector 40 has a length (L) of about 50 millimeters (mm), with a base height (H) of about 11.4 mm. The electrical connector 40 contains 4 electrical conductors 20. Six of the ribs in the second series of ribs 26 are about 2 mm in width (RW), each being evenly spaced from the others, by a distance of about 1 mm. The electrical connector 40 further contains a series of "melt ribs."

Figures 1, 9:
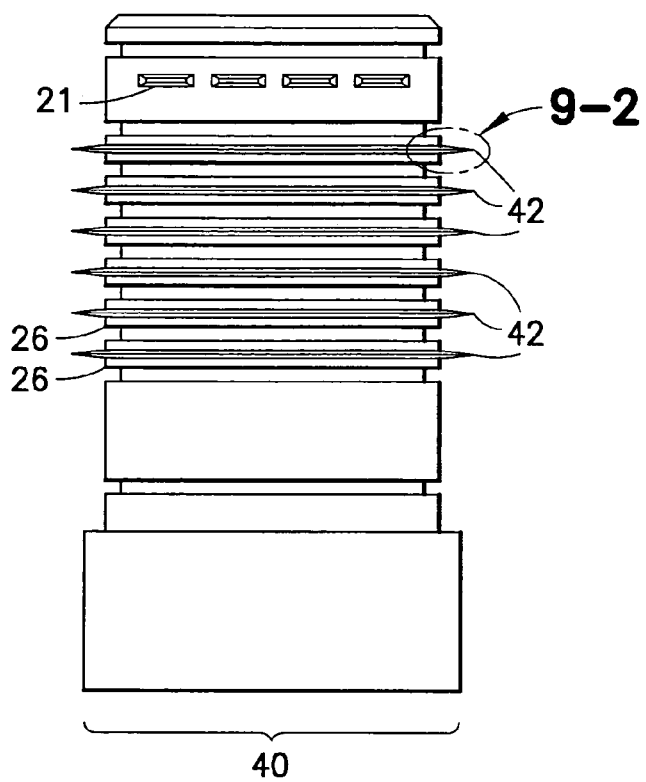
Figures 2, 9:
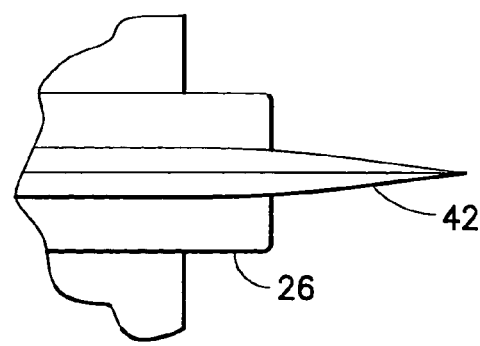

The melt ribs incorporated into the electrical connector 40 provide a further impediment to the flow of fluids. The "melt ribs" are shown in FIG. 9. FIG. 9-1 identifies one embodiment where melt ribs 42 are located on the second series of ribs 26. The melt rib 42 is shown in the enlarged partial view of FIG. 9-2. In FIG. 9-2 a melt rib 42 is formed as excess plastic on the rib.

The melt rib 42 shown on the electrical connector 40 is added to supply additional sealing. The use of melt ribs 42 adds thin ribs of material over the second series of ribs 26 of the electrical connector 40. The melt ribs 42 melt during the over-molding process, mix, fuse and re-solidify with the over mold plastic, thus creating an additional seal between the electrical connector 40 and the over mold plastic used to create the FEC 100 shown in FIG. 1. In one embodiment, the melt ribs 42 circumscribe the electrical connector 40, just as the ribs 25 circumscribe the electrical connector 40.

In the preferred embodiment, where the pre-mold electrical connector 40 is formed of POM, the melt ribs are designed to melt at the melting point of the POM, or about 165° C. to about 177° C. Once the melt ribs have been heated to the melting point of the material used in the electrical connector 40, the melt ribs flow and mix with the over-mold material. The flow of materials between the electrical connector 40 and the over-mold provides for an improved seal.

In various embodiments, the melt ribs 42 may appear on each rib in the second series of ribs 26, limited numbers of the ribs, or on other portions of the electrical connector 40. The location for each of the melt ribs 42 on the electrical connector 40 may be determined by factors that include, but are not limited to, temperature, pressure and viscosity of the fluid.

In some embodiments, the pre-mold electrical connector 40 may be further subjected to a process of "impregnation" before incorporation into the over-mold 100. Impregnation is employed to even further increase the integrity of the seal between the electrical connector 40, and the over-mold material used in the FEC 100. In embodiments where impregnation is included, an intermediate material is applied over the electrical connector 40. In these embodiments, the electrical connector 40 is placed into a vacuum chamber and sealed. The intermediate material is pumped into the chamber until the material just covers the electrical connector 40 while leaving the electrical contacts exposed. Pressure is reduced in the vacuum chamber to encourage the migration of air or other gas bubbles from the electrical connector 40, as well as from the intermediate material. In this manner, the intermediate material fills voids and improves the characteristics of the electrical connector 40. Afterward, the vacuum is relieved, and the sudden rush of gas applies pressure to the intermediate material, further seating the intermediate material over the electrical connector 40.

In an example of impregnation, and where the FEC 100 is used in the fuel environment, a highly chemically resistive plastic is selected for forming the FEC 100. In this exemplary embodiment, a commercially available product, LOCTITE 5110™ can be used as the intermediate material. LOCTITE 5110 ™ is a dimethacrylate type chemical that can be used as an electrical grade anaerobic sealant, and cures to form a tough thermoplastic in the form of a cross-linked acrylic. The material provides for excellent electrical insulation while being used in harsh environments including long term exposure to solvents. Once the intermediate material is impregnated into the electrical connector 40, the excess material is removed. In various other embodiments, a polymeric material other than LOCTITE 5110™ is used as the intermediate material.

In this exemplary embodiment, use of LOCTITE 5110™ as an intermediate material provides for certain useful or advantageous properties. For example, the LOCTITE 5110™ remains uncured, or substantially uncured, in the presence of air. Once the pre-mold 40 has been included into the post-mold, the intermediate material is no longer exposed to air. As a result, the curing process occurs once the pre-mold 40 is in the final configuration as a FEC 100. A further advantage is realized by the same property of the intermediate material. That is, excess intermediate material, such as material covering the electrical contacts 21, 22 may be easily removed by a suitable wash.

After the electrical connector 40 is subjected to impregnation, or not, as the case may be, the electrical connector 40 is next incorporated into an over-mold in order to create a FEC 100.

The Flange Electrical Connector 100

After the pre-mold electrical connector 40 is formed, it is incorporated into a final molding, or post-mold, thereby forming a FEC 100. The post-mold may include the pre-mold electrical connector 40 with other components or features to provide for an Integrated Flange Seal 1, or IFS 1, such as the fuel flange connector shown in FIG. 1. In other embodiments, the post-mold may incorporate the pre-mold electrical connector 40 into a form that is designed to mate with a system other than a fuel system, without incorporating other devices or features. The actual configuration of the FEC 100, and the IFS 1 are dependent upon a variety of factors, including, but not limited to, the needs of the user.

Figure 10:
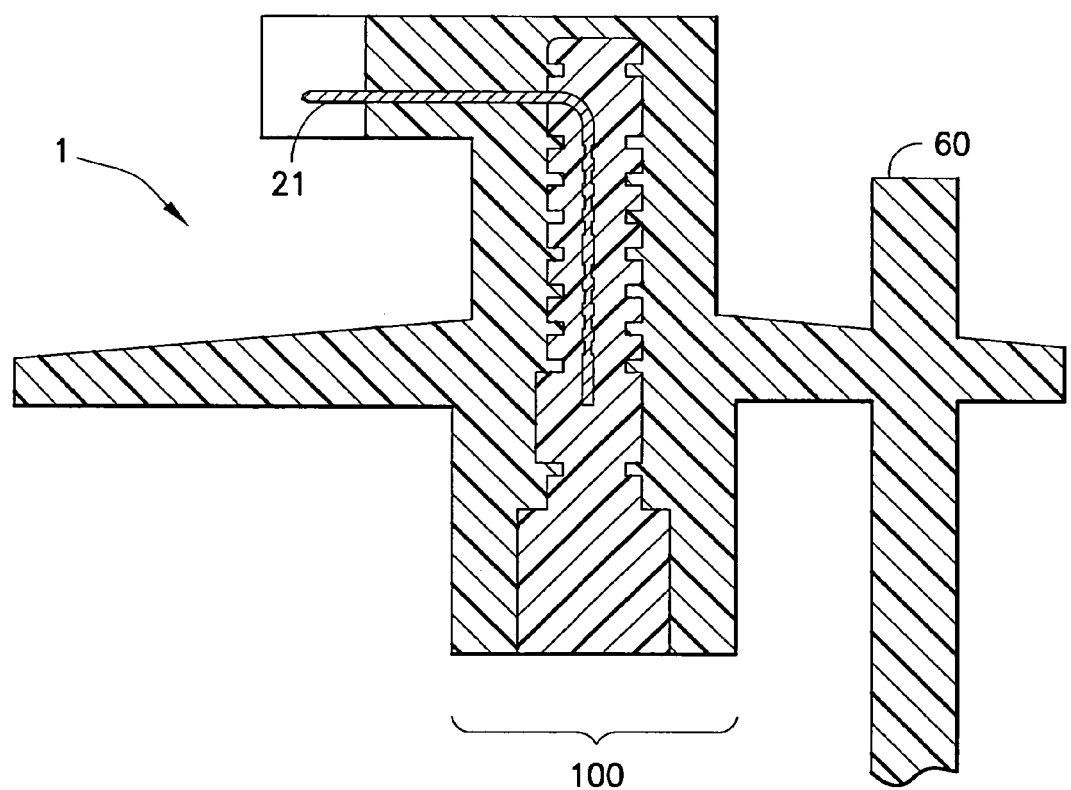
FIG. 10 is a cross sectional view of a portion of the Integrated Flange Seal, IFS, showing the incorporation of the pre-mold connector of FIGS. 6-9.

The FEC 100 is shown in FIG. 10. In FIG. 10, the FEC 100 is incorporated into an Integrated Flange Seal 1, or IFS 1. The IFS 1 shown further includes a separate penetration 60, in this case the penetration 60 being for a fuel line connection (not shown).

Once the pre-mold electrical connector 40 is incorporated into the post-mold FEC 100, the second series of ribs 26 define a second torturous path. This second torturous path provides the same design advantages as the first torturous path, namely, the second torturous path provides an impediment to the passage of foreign matter. The use of the same materials, or substantially similar materials, in the pre-mold electrical connector 40 and post-mold FEC 100, further provide for effective sealing of the FEC 100.

The combination of a dual torturous path design with the use of melt ribs 42 thus provides for a highly effective seal in an electrical connector 40 useful for impeding the passage of fluids including hydrocarbon based fuel components. In various embodiments, the construction of the electrical connector 40 further using impregnation provides for additional sealing effectiveness.

The combination of the dual torturous path design with the use of impregnation thus also provides for a highly effective seal in an electrical connector 40 useful for impeding the passage of fluids including hydrocarbon based fuel components. In various embodiments, the construction of the electrical connector 40 further using melt ribs provides for additional sealing effectiveness.

It should be understood that the foregoing description and embodiments are only illustrative of the invention. It should further be recognized by one skilled in the art that while the teachings herein have been expressed in terms of a FEC 100 for an automobile, a variety of embodiments and applications are possible while remaining within the teachings of this invention. For example, the FEC 100 could be used to provide a sealed electrical connection to a system containing fluids, such as but not limited to, insecticide or pesticides.

A variety of factors that may be varied in order to realize other embodiments include, but are not limited to, characteristics of the torturous path, including appearance and number of features in the pathway; the number, placement and volume of the melt ribs; properties of material selected for impregnation; pressure and duration of the impregnation technique; size, number and conductivity of the electrical conductors 20; arrangement or electrical separation of the electrical conductors 20; properties of materials selected for coating of electrical conductors 20, the pre-mold electrical connector 40, or the post-mold FEC 100; sealing efficiency requirements; post-mold FEC 100 applications, and properties of the environment.

The invention claimed is:

1. A method for forming an electrical connector, the method comprising:
    providing at least one electrical conductor comprising a first plurality of ribs;
    jacketing said at least one electrical conductor with an electrical insulating material to form a connector body, wherein said first plurality of ribs defines a first torturous path with said electrical insulating material for impeding the passage of fluid, said connector body comprising a second plurality of ribs for defining a second torturous path for impeding passage of fluid between said connector body and a surrounding structure within which at least a portion of said connector body is disposed after said connector body is formed, wherein said second plurality of ribs comprise melt ribs formed when said second plurality of ribs is formed.

2. The method as in claim 1, wherein said electrical insulating material comprises polyoxymethylene.

3. The method as in claim 1, wherein said fluid comprises a hydrocarbon based fuel.

4. The method as in claim 1, further comprising:
    impregnating a coating onto the connector body.

5. The method as in claim 4, wherein said coating comprises dimethylacrylate.

6. A method for forming a fuel flange, the method comprising:
    providing at least one electrical conductor comprising a first plurality of ribs;
    jacketing said at least one electrical conductor with an electrical insulating material to form a connector body, said first plurality of ribs defining a first torturous path with said electrical insulating material for impeding the passage of hydrocarbon based fuel components, said connector body comprising a second plurality of ribs comprising a substantially uniform series of ribs looping around an exterior of the connector body; and,
    molding said fuel flange around said connector body for forming a second torturous path, said second plurality of ribs defining said second torturous path for impeding passage of hydrocarbon based fuel components between said connector body and said fuel flange.

7. The method as in claim 6, where said second plurality of ribs comprises melt ribs.

8. The method as in claim 6, where said electrical insulating material comprises polyoxymethylene.

9. The method as in claim 6, further comprising:
    impregnating a coating over said connector body.

10. The method as in claim 6, wherein said coating comprises dimethylacrylate.

11. A method of forming a vehicle fuel tank combined fuel flange and electrical connector comprising:
    molding a pre-mold housing onto a plurality of electrical conductors to form a pre-mold electrical connector, wherein the electrical conductors comprising ribs such that first torturous joints are formed between the pre-mold housing and the electrical conductors; and
    overmolding a flange member onto the pre-mold electrical connector, wherein the pre-mold housing comprises a series of circumferential ribs on an exterior side which form a second torturous joint between the flange member and the pre-mold electrical connector.

12. A method as in claim 11 wherein the step of overmolding comprises overmolding a portion of the flange member onto the electrical conductors.

13. A method as in claim 11 wherein the electrical conductors comprise right angle contacts and the pre-mold housing is molded onto a bend of the right angle contacts.

14. A method as in claim 13 wherein the right angle contacts comprise a male contact portion at a first end and a flap contact portion at an opposite second end, and wherein the pre-mold housing is molded onto the flap contact portion.

15. A method as in claim 11 wherein molding of the pre-mold housing comprises forming melt ribs on the ribs of the pre-mold housing.

16. A method as in claim 11 further comprising impregnating the pre-mold housing with a sealing material.

17. A method as in claim 16 wherein the step of impregnating occurs before the flange member is overmolded onto the pre-mold electrical connector.

18. A method as in claim 16 wherein the step of impregnating comprises use of a material which remains substantially uncured in the presence of air.

* * * * *